(12) United States Patent
Franklin et al.

(10) Patent No.: US 7,678,488 B2
(45) Date of Patent: Mar. 16, 2010

(54) INTEGRATED AND MODULAR BSP/MEA/MANIFOLD PLATES FOR FUEL CELLS

(75) Inventors: Jerrold E. Franklin, Sacramento, CA (US); Eric S. Mettler, Cameron Park, CA (US)

(73) Assignee: Altergy Systems, Inc., Folsom, CA (US)

( * ) Notice: Subject to any disclaimer, the term of this patent is extended or adjusted under 35 U.S.C. 154(b) by 0 days.

(21) Appl. No.: 11/839,484

(22) Filed: Aug. 15, 2007

(65) Prior Publication Data
US 2008/0070081 A1    Mar. 20, 2008

Related U.S. Application Data

(63) Continuation of application No. 09/834,389, filed on Apr. 13, 2001, now abandoned.

(60) Provisional application No. 60/249,662, filed on Nov. 17, 2000, provisional application No. 60/226,471, filed on Aug. 18, 2000.

(51) Int. Cl.
*H01M 8/02* (2006.01)
(52) U.S. Cl. .......................................... 429/35; 429/36
(58) Field of Classification Search ................ 429/26, 429/35, 36
See application file for complete search history.

(56) References Cited

U.S. PATENT DOCUMENTS

| | | |
|---|---|---|
| 4,212,929 A | 7/1980 | Grevstad et al. |
| 4,445,994 A | 5/1984 | Divisek et al. |
| 4,467,019 A | 8/1984 | Feigenbaum |
| 4,503,132 A | 3/1985 | Struthers |
| 4,505,992 A | 3/1985 | Dettling et al. |
| 4,514,475 A | 4/1985 | Mientek |
| 4,548,675 A | 10/1985 | Gordy |
| 4,581,114 A | 4/1986 | Morris et al. |
| 4,588,661 A | 5/1986 | Kaufman et al. |
| 4,609,595 A | 9/1986 | Nickols |
| 4,614,692 A | 9/1986 | Kajiyama et al. |
| 4,737,421 A | 4/1988 | Uemura et al. |
| 4,743,519 A | 5/1988 | Kaji et al. |
| 4,761,349 A | 8/1988 | McPheeters et al. |
| 4,767,519 A | 8/1988 | de Nora |
| 4,818,640 A | 4/1989 | Fukuda et al. |
| 4,855,193 A | 8/1989 | McElroy |
| 5,084,364 A | 1/1992 | Quaadvliet |
| 5,176,966 A | 1/1993 | Epp et al. |
| 5,200,278 A * | 4/1993 | Watkins et al. ................. 429/24 |
| 5,328,779 A | 7/1994 | Tannenberger et al. |
| 5,338,621 A | 8/1994 | Bossel |
| 5,470,671 A | 11/1995 | Fletcher et al. |
| 5,484,514 A | 1/1996 | Katayama |
| 5,514,487 A * | 5/1996 | Washington et al. .......... 429/39 |
| 5,683,828 A | 11/1997 | Spear et al. |

(Continued)

FOREIGN PATENT DOCUMENTS

CA    2015782 A1    10/1991

(Continued)

*Primary Examiner*—Gregg Cantelmo
(74) *Attorney, Agent, or Firm*—John P. O'Banion

(57) ABSTRACT

The present invention concerns improvements in fuel cell fabrication. It concerns an improved, integrated and modular BSP/MEA/Manifolds, which facilitates single cell (module) leak and performance testing prior to assembly in a fuel cell stack as well as facilitating manufacturing and cost reduction.

18 Claims, 12 Drawing Sheets

U.S. PATENT DOCUMENTS

| | | |
|---|---|---|
| 5,698,337 A | 12/1997 | Nitschke et al. |
| 5,773,161 A | 6/1998 | Farooque et al. |
| 5,800,152 A | 9/1998 | Taimatu et al. |
| 5,858,567 A | 1/1999 | Spear, Jr. et al. |
| 5,863,671 A | 1/1999 | Spear, Jr. et al. |
| 5,945,232 A | 8/1999 | Ernst et al. |
| 5,976,727 A | 11/1999 | Mercuri et al. |
| 6,020,083 A | 2/2000 | Breault et al. |
| 6,030,718 A | 2/2000 | Fuglevand et al. |
| 6,051,331 A | 4/2000 | Spear, Jr. et al. |
| 6,057,054 A | 5/2000 | Barton et al. |
| 6,059,943 A | 5/2000 | Murphy et al. |
| 6,060,189 A | 5/2000 | Mercuri et al. |
| 6,066,409 A | 5/2000 | Ronne et al. |
| 6,080,502 A | 6/2000 | Nolscher et al. |
| 6,080,503 A | 6/2000 | Schmid et al. |
| 6,087,033 A | 7/2000 | Grune et al. |
| 6,132,895 A | 10/2000 | Pratt et al. |
| 6,159,628 A | 12/2000 | Grasso et al. |
| 6,165,634 A | 12/2000 | Krasij et al. |
| 6,190,793 B1 | 2/2001 | Barton et al. |
| 6,207,310 B1 | 3/2001 | Wilson et al. |
| 6,214,486 B1 | 4/2001 | Okamoto |
| 6,218,035 B1 | 4/2001 | Fuglevand et al. |
| 6,322,919 B1 * | 11/2001 | Yang et al. ............... 429/34 |
| 6,338,492 B1 | 1/2002 | Schilling et al. |
| 6,358,642 B1 | 3/2002 | Griffith et al. |
| 6,372,374 B1 | 4/2002 | Li et al. |
| 6,379,795 B1 | 4/2002 | Bisaria et al. |
| 6,410,179 B1 | 6/2002 | Boyer et al. |
| 6,468,682 B1 | 10/2002 | Fuglevand et al. |
| 6,531,238 B1 | 3/2003 | King |
| 2002/0022382 A1 | 2/2002 | Franklin et al. |
| 2002/0065000 A1 | 5/2002 | Morozumi |
| 2003/0064612 A1 | 4/2003 | England et al. |
| 2003/0075311 A1 | 4/2003 | Seaba et al. |
| 2003/0104263 A1 | 6/2003 | Molter et al. |
| 2005/0026020 A1 | 2/2005 | Franklin et al. |

FOREIGN PATENT DOCUMENTS

| | | |
|---|---|---|
| DE | 4307727 A1 | 9/1994 |
| DE | 19523317 A1 | 11/1996 |
| DE | 19624887 A1 | 1/1997 |
| EP | 0446680 A1 | 9/1991 |
| EP | 0604683 A1 | 7/1994 |
| GB | 2323700 A | 9/1998 |
| GB | 2326017 A | 12/1998 |
| GB | 2348047 A | 9/2000 |
| JP | 60086012 | 5/1985 |
| JP | 03049160 A | 3/1991 |
| WO | 0219451 A2 | 3/2002 |

* cited by examiner

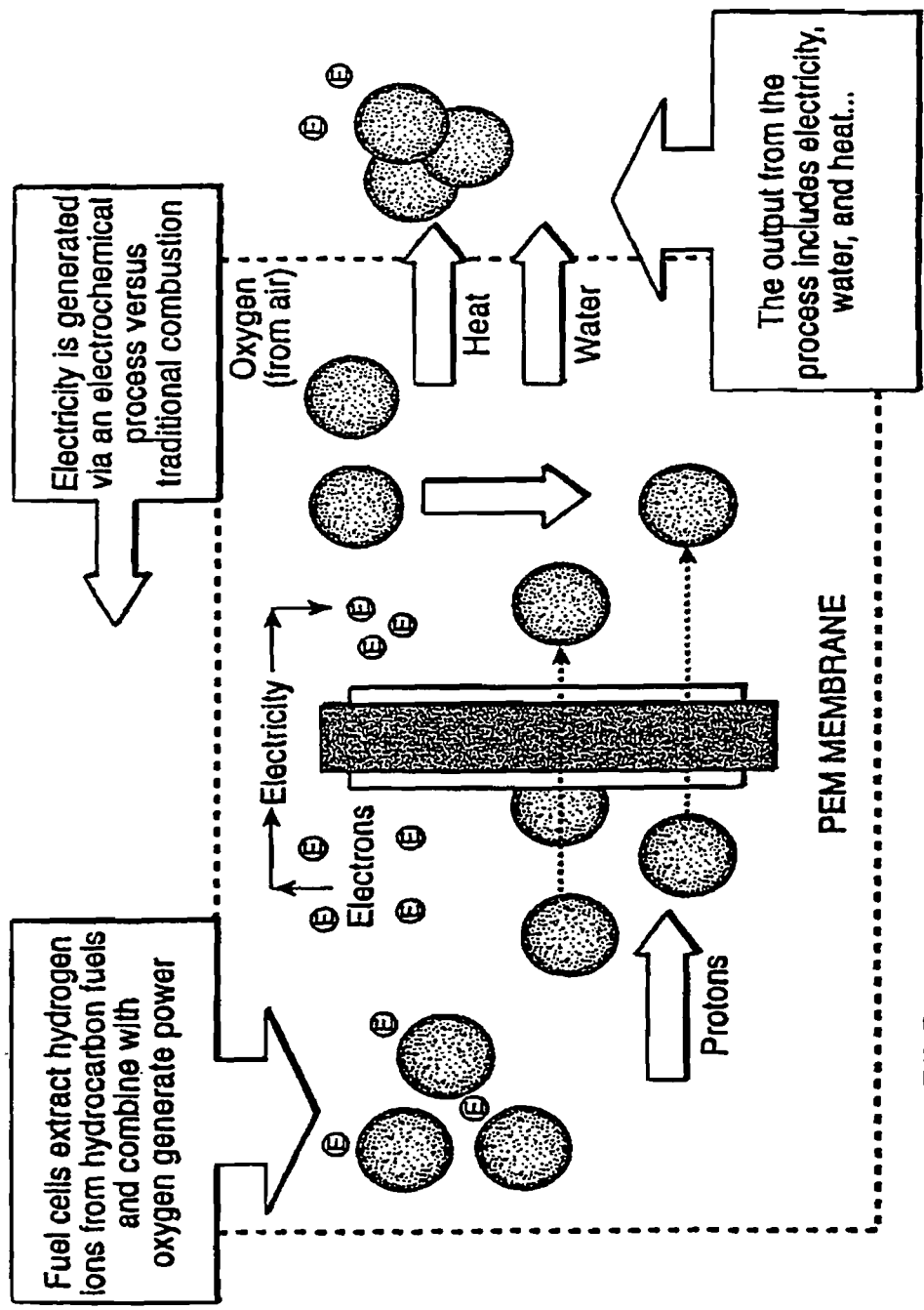
FIG._1 (PRIOR ART)

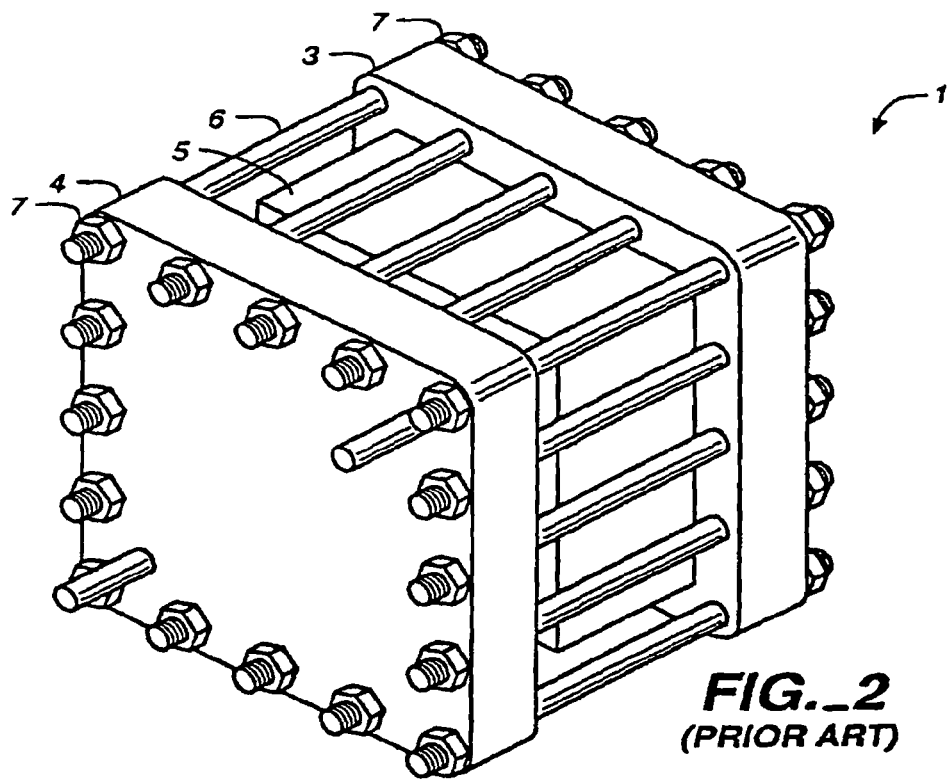
FIG._2
(PRIOR ART)
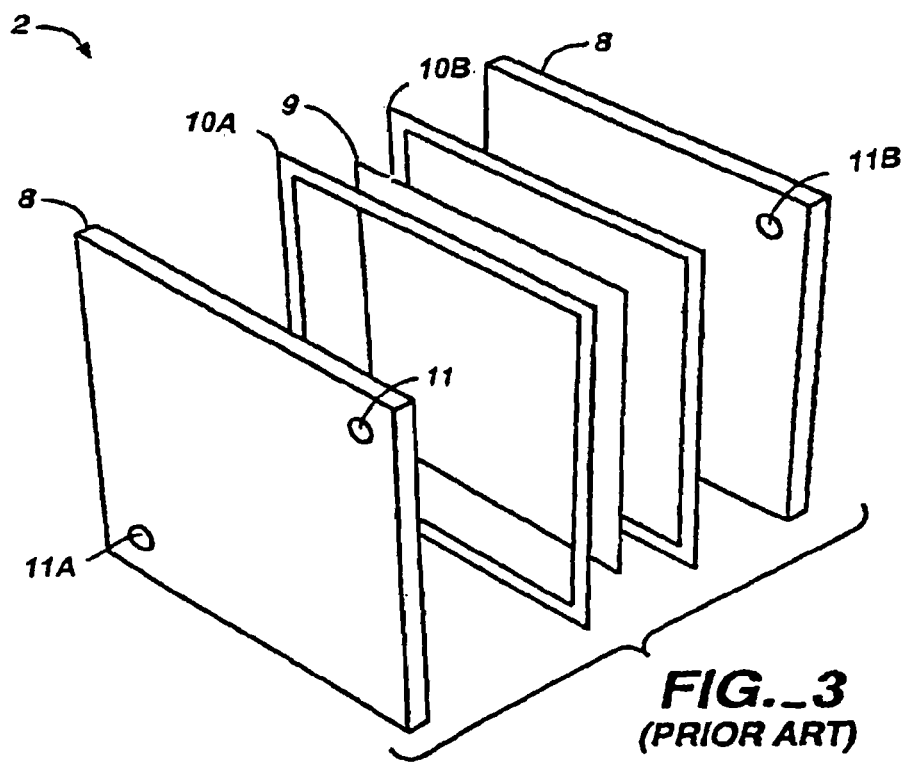
FIG._3
(PRIOR ART)

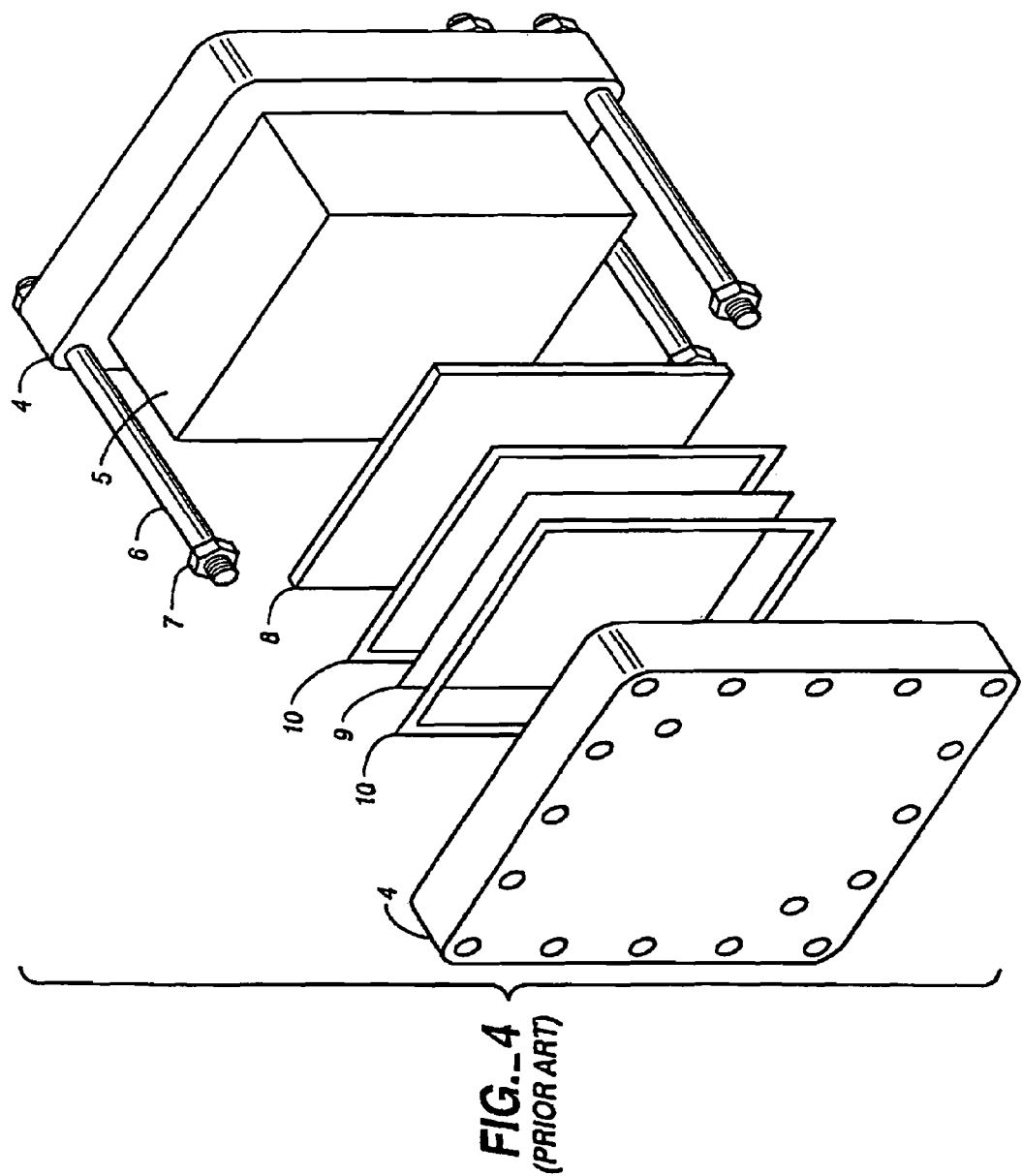
FIG._4
(PRIOR ART)

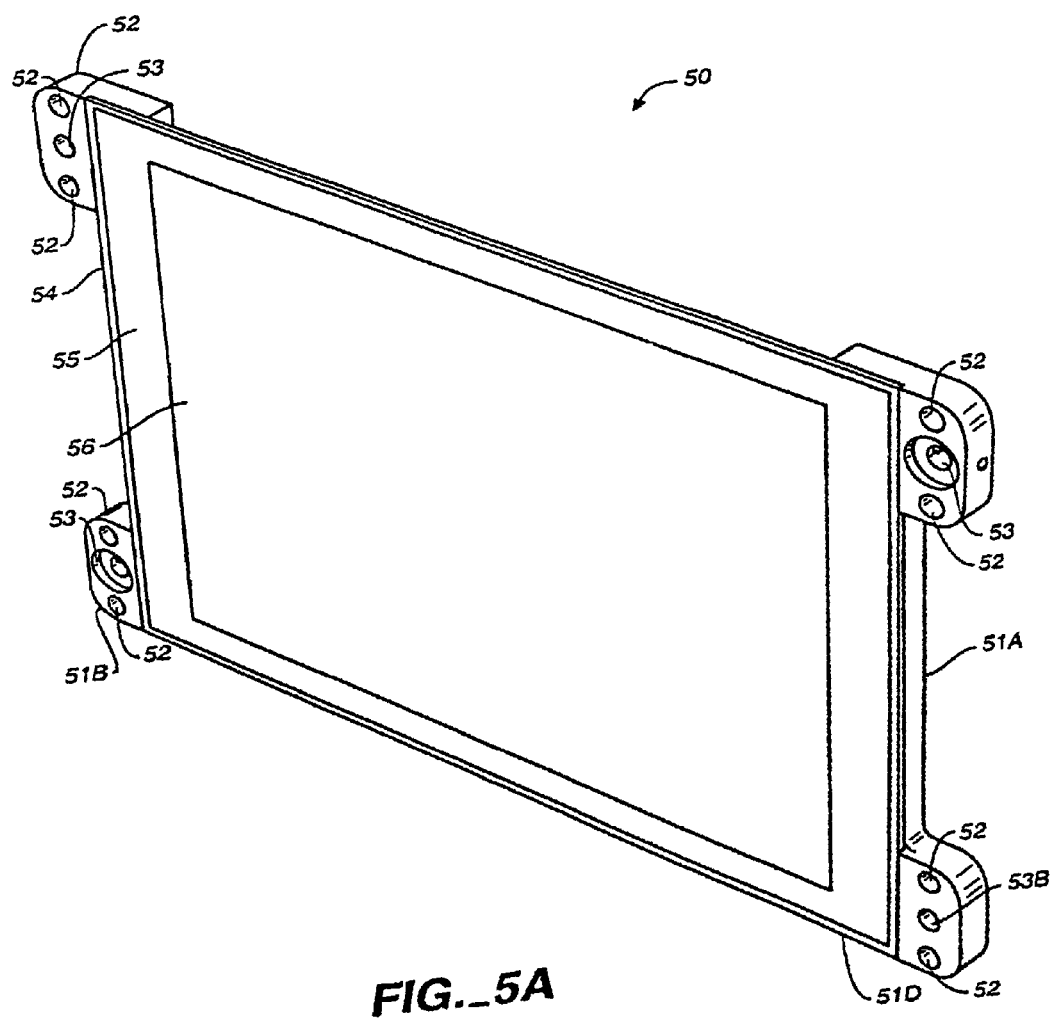
FIG._5A

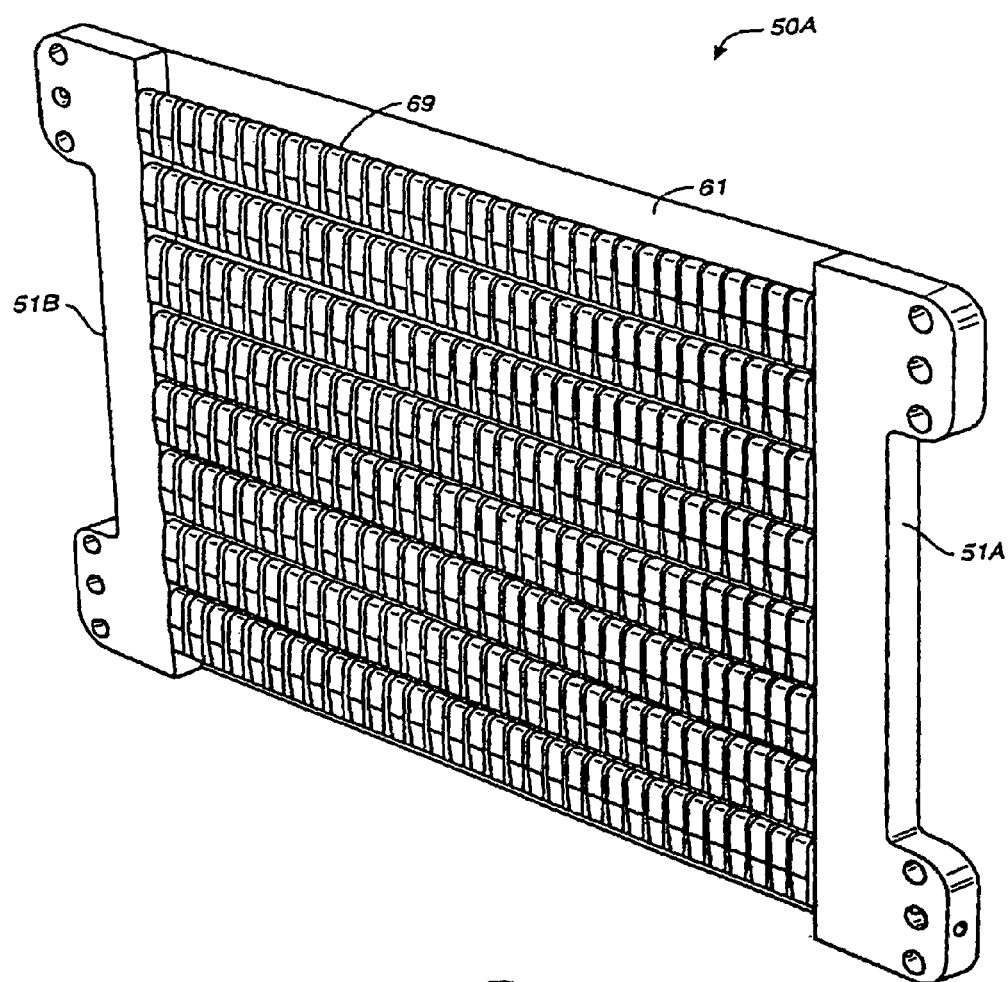
FIG._5B

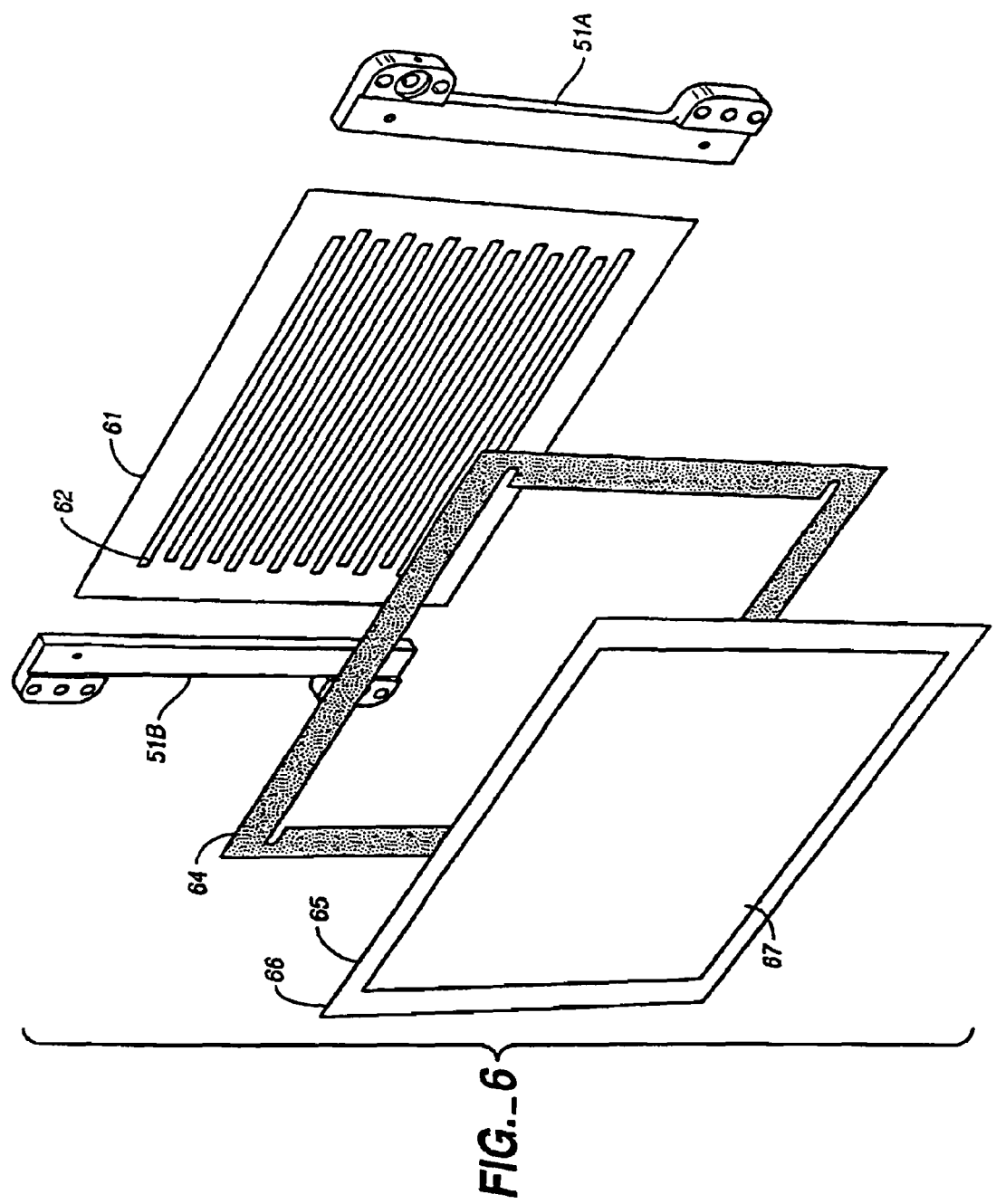

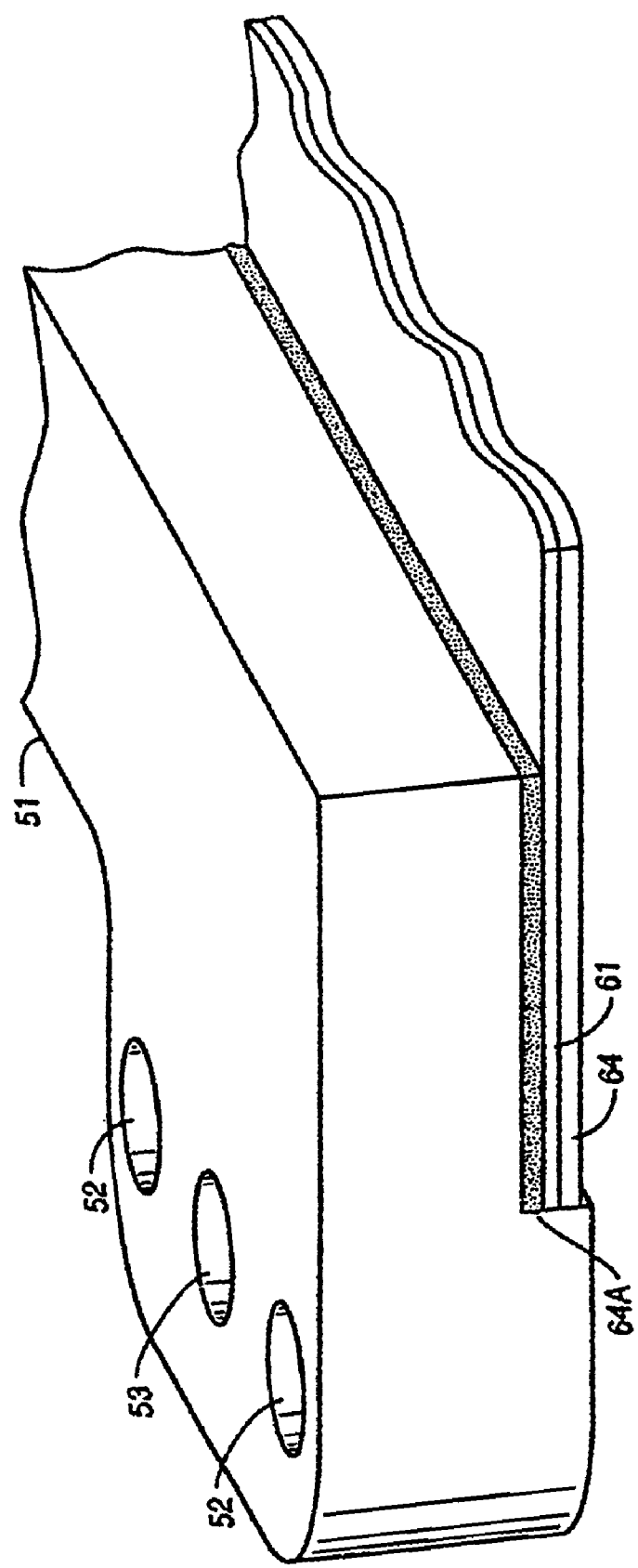
FIG._7A

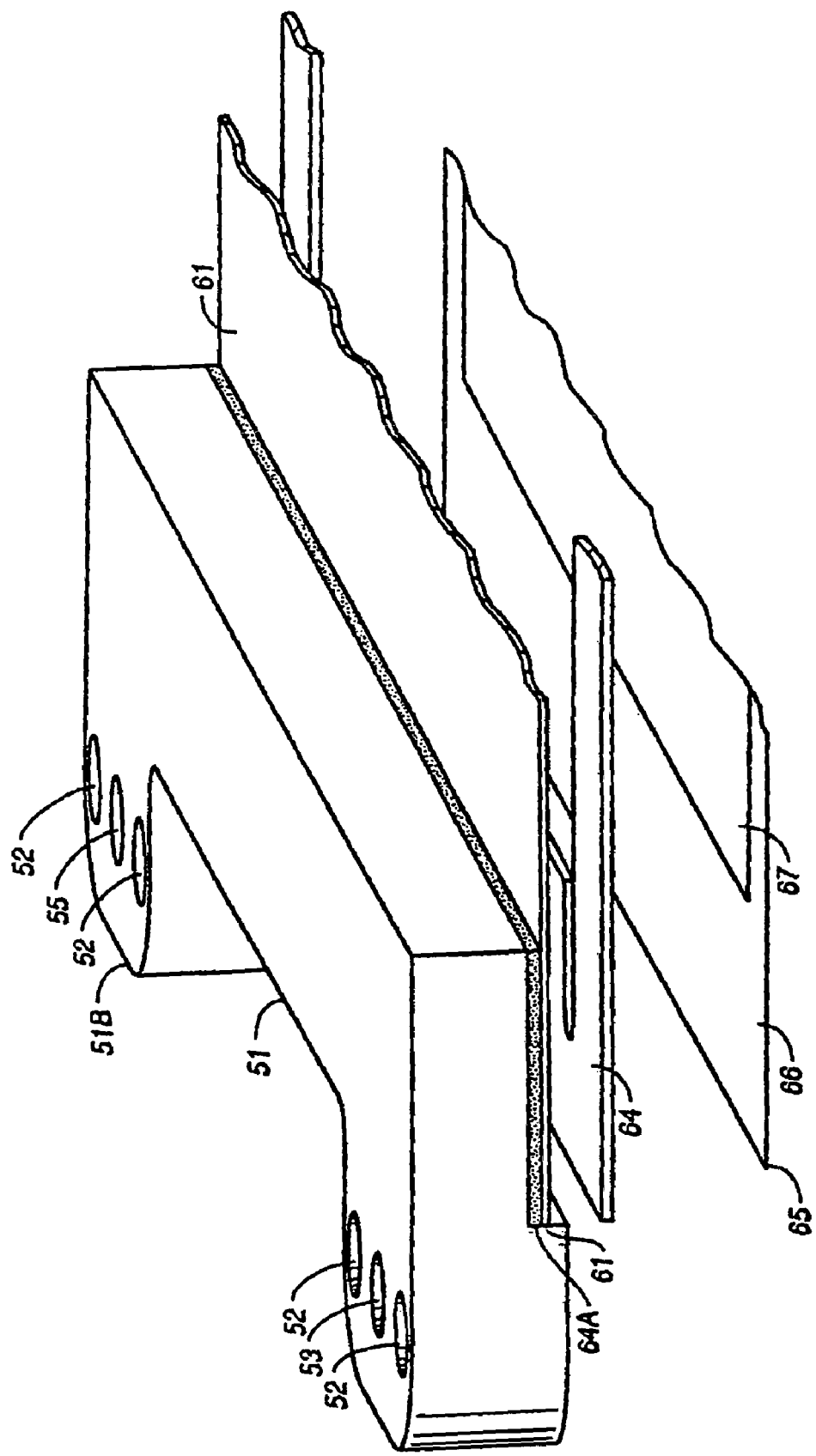
FIG._7B

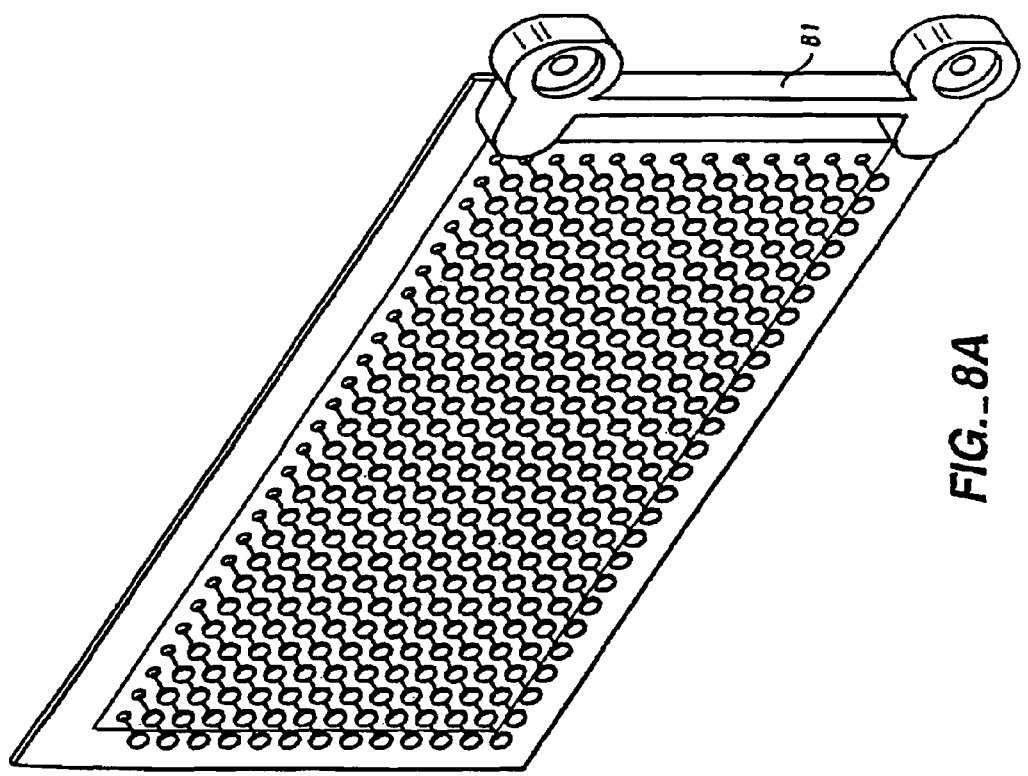
FIG._8A

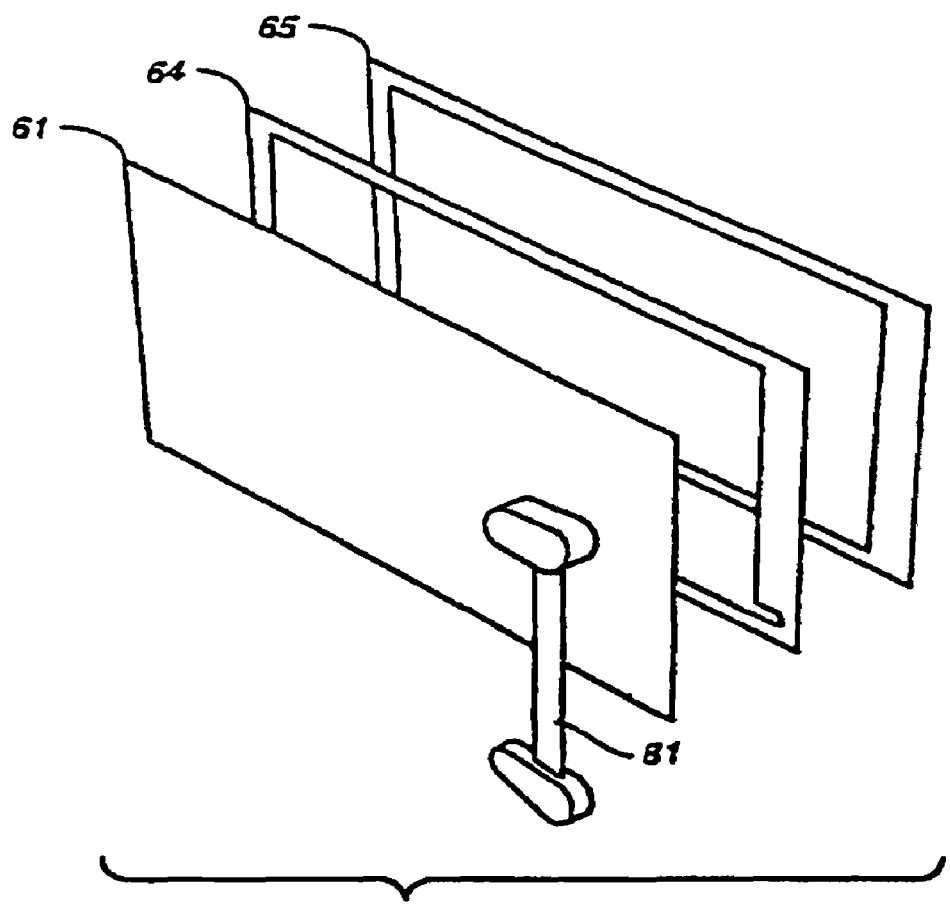
FIG._8B
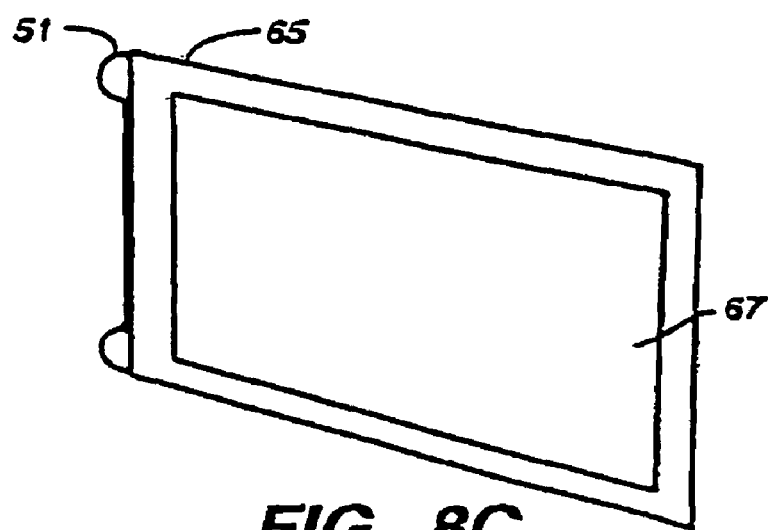
FIG._8C

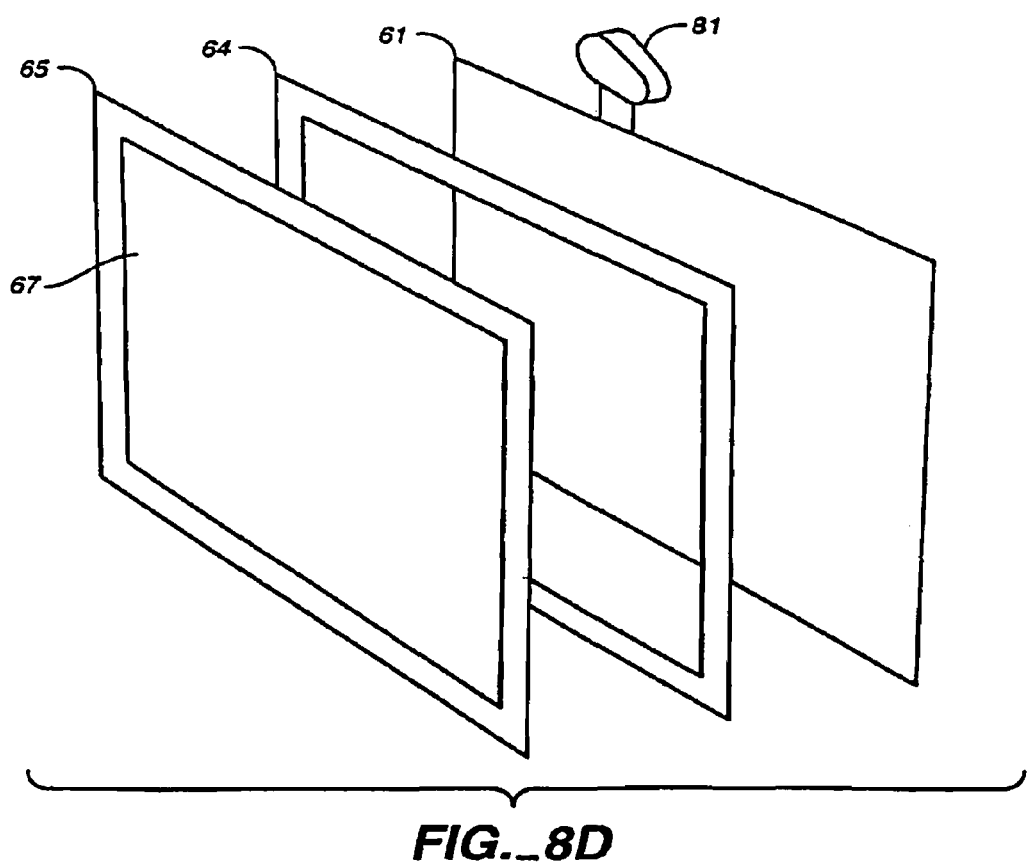
FIG._8D

INTEGRATED AND MODULAR BSP/MEA/MANIFOLD PLATES FOR FUEL CELLS

RELATED APPLICATIONS

This application is a continuation of U.S. Ser. No. 09/834,389, filed Apr. 13, 2001, now abandoned, incorporated herein by reference in its entirety, which claims priority from U.S. provisional application No. 60/249,662, filed Nov. 17, 2000, incorporated herein by reference in its entirety, and from U.S. provisional application No. 60/266,471, filed Aug. 18, 2000, incorporated herein by reference in its entirety.

BACKGROUND OF THE INVENTION

1. Field of the Invention

The present invention relates to electrochemical energy converters with a polymer electrolyte membrane (PEM), such as fuel cells or electrolyzer cells or stacks of such cells, wherein the individual cells are modular units which have integrated the bipolar separator plate (BSP), the membrane electrode assembly (MEA) and the reactant and coolant manifolds. These individual components are assembled into integrated modules and these modules are tested individually for full functionality before being assembled into a complete fuel cell unit (stack) as individual components. In particular the several components of the integrated modular BSP/MEA/Manifolds (fuel cell module), i.e., the bipolar separator plate, membrane electrode assembly, separate diffusion layers (if used), gaskets (if used), manifolds, adhesives, and seals (if used) are manufactured as separate entities before being incorporated into a fuel cell module before being assembled in a complete fuel cell unit (stack). In a number of embodiments, these fuel cell components can be as large or as small as the end use requires.

2. Description of the Related Art

Electrochemical cells comprising polymer electrolyte membranes (PEM) may be operated as fuel cells wherein a fuel and an oxidizer are electrochemically converted at the cell electrodes to produce electrical power, or as electrolyzers wherein an external electrical current is passed between the cell electrodes, typically through water, resulting in generation of hydrogen and oxygen at the respective electrodes of the cells.

Fuel cells are energy conversion devices that use hydrogen, the most abundant fuel on earth, and oxygen, usually from the air, to create electricity through a chemical conversion process, without combustion and without harmful emissions. The voltage and current output depends on the number of cells in the stack, total active surface area and efficiency. The basic process, for a single cell, is shown in FIG. 1.

Traditional fuel cell stacks 1, see FIG. 2, are made of many individual cells 2, see FIG. 3, which are stacked together. The ability to achieve the required gas and liquid sealing and to maintain intimate electrical contact has traditionally been accomplished with the use of relatively thick and heavy "end plates" (3, 4) with the fuel cell stack 5 held together by heavy tie-rods or bolts 6 and nuts 7 (or other fasteners) in a "filter-press" type of arrangement, see FIGS. 2 and 4. Disassembly and analysis of fuel cell stacks built by traditional and other methods reveals evidence of incomplete electrical contact between bipolar separator plates (BSPs) 8 and the membrane electrode assembly (MEAs) 9, which results in poor electrical conduction, lower cell performance, often along with evidence of gas and liquid leakage.

The traditional method of assembly of Proton Exchange Membrane (PEM) fuel cells requires several parallel and serial mechanical processes that must be accomplished simultaneously for each individual cell, see FIG. 3.

1. The Membrane Electrode Assembly (MEA) 9 must be sealed to the Bipolar Separator Plates (BSPs) 8 at each plate/MEA interface, via a gasket such as 10A and 10B.

2. The fuel, oxidizer and coolant manifolds 11A and 11B are all required to be sealed at the same time during fabrication as the MEA is sealed to the BSP.

3. The BSPs 8 must be in intimate electrical contact with the electrode assembly 9, across its entire surface area, at all times for optimum performance. As the traditional fuel cell stack 1 is assembled, each individual cell (layer) 2 must seal, manage gasses and liquid, produce power and conduct current. Each cell relies on all the other cells for these functions. Additionally, all seals and electrical contacts must be made concurrently at the time of assembly of the stack, see FIGS. 2 and 3.

The assembly of a traditional PEM cell stack which comprises a plurality of PEM cells each having many separate gaskets which must be fitted to or formed on the various components is labor-intensive, costly and in a manner generally unsuited to high volume manufacture due to the multitude of parts and number of assembly steps required.

With the conventional PEM stack design 1, see FIG. 2, it is problematic to remove and repair an individual cell 2 (see FIG. 3) or to identify or test which cell or cells in the stack may require repair due to leakage or performance problems. In many cases the entire stack assembly is required to be dissembled. The disassembly of a stack consisting of multiple cells, each comprising separate cell components can be very costly as in many instances, after the removal of one cell, the gaskets of the remaining cells may need to be replaced before the stack can be reassembled and operated. Additionally, the potential for damage to the MEA is very high. Upon reassembly, there is no assurance of the performance or of a leak tight condition. This is a very time consuming and therefore costly process.

Some patents of interest are listed below.

R. G. Spear, et al. in U.S. Pat. No. 5,683,828, assigned to H Power Corporation disclose metal platelet fuel cells production and operation methods.

R. G. Spear, et al. in U.S. Pat. No. 5,858,567, assigned to H Power Corporation disclose fuel cells employing integrated fluid management platelet technology.

R. G. Spear, et al. in U.S. Pat. No. 5,863,671, assigned to H Power Corporation disclose plastic platelet fuel cells employing integrated fluid management.

R. G. Spear, et al. in U.S. Pat. No. 6,051,331 assigned to H Power Corporation disclose fuel cell platelet separators having coordinate features.

These four U.S. patents to Spear et al. describe conventional fuel cell assembly.

W. A. Fuglevand, et al. in U.S. Pat. No. 6,030,718, assigned to Avista Corporation disclose a proton exchange membrane fuel cell power system.

D. G Epp, et al. in U.S. Pat. No. 5,176,966 disclose a fuel cell membrane electrode and a seal assembly.

W. J. Fletcher, et al. in U.S. Pat. No. 5,470,671 disclose an electrochemical fuel cell which employs ambient air as both oxidant and coolant.

W. D. Ernest, et al. in U.S. Pat. No. 5,945,232 disclose a PEM-type fuel cell assembly having multiple parallel fuel cell sub-stacks employing shared fluid plate assemblies and shared membrane electrode assemblies.

R. A. Mercuri, et al. in U.S. Pat. No. 5,976,727 disclose an electrically conductive seal for fuel cell components.

R. D. Breault, et al. in U.S. Pat. No. 6,020,083 disclose a membrane electrode assembly for a PEM fuel cell.

R. H. Burton, et al. in U.S. Pat. No. 6,057,054 disclose a membrane electrode assembly for an electrochemical fuel cell and a method of making an improved membrane electrode assembly.

J. A. Ronne, et al. in U.S. Pat. No. 6,066,409 disclose an electrochemical fuel cell stack with improved reactant manifolding and sealing.

O. Schmidt et al. in U.S. Pat. No. 6,080,503 disclose polymer electrolyte membrane fuel cells and stacks with adhesively bonded layers.

Other art of general interest includes, for example: U.S. Pat. No. 5,338,621; European Patent 446,680; U.S. Pat. Nos. 5,328,779; 5,084,364; 4,548,675 and 4,445,994.

All of the references, patents, patent applications, standards, etc. cited in this application are incorporated by reference in their entirety.

With reference to FIG. 3 and Claims 1 and 2 of U.S. Pat. No. 6,080,503 which is incorporated herein by reference, the adhesive bonding agent used is for bonding "a first separator plate" and "a second separator plate" to a membrane electrode assembly", in the current embodiment a single separator plate is bonded to a single MEA and to manifolds which are external to the membrane assembly with no through passages holing the membrane. This embodiment forms a fuel cell module (assembly).

It is apparent from the above discussion that existing fuel cell technology can be significantly improved using modular components and in the assembly of the multiple fuel cell unit (stack). This invention concerns an improved, integrated and modular BSP/MEA/Manifold assembly, which facilitates single cell (module) leak and performance testing prior to assembly. It also eliminates gaskets between adjacent BSP and simplifies assembly. The present invention of modular, integrated units provides such improvements for a fuel cell.

SUMMARY OF THE INVENTION

This invention concerns an improved, integrated and modular BSP/MEA/Manifold, which facilitates single cell (module) assembly as well as composed leak and performance testing of the modules prior to stack assembly. It also eliminates inter BSP gaskets and seals and simplifies cell assembly as well as stack assembly.

In addition, thin, flexible or rigid BSPs are used to manage reactants and maintain separation of the fuel and oxygen (or air); provide structural support for the MEAs and provide electrical contact and conductance. They also provide for the decoupling of the electrical contacts and for the sealing from the fuel cell stack assembly, thus reducing mechanical difficulties in manufacture and assembly, conducting current more efficiently and eliminating serial sealing problems. The present invention of modular, integrated units provides such improvements for a fuel cell. In particular, the present fuel cell comprises:

1. a single flexible or rigid bipolar separator plate;.
2. a flexible membrane electrode assembly;
3. a flexible bond or seal interposed between said flexible or rigid separator plate and said flexible membrane electrode assembly wherein said flexible bond or seal may be or may not be an adhesive bond or seal which encapsulates edge portions of said flexible or rigid separator plate and said flexible membrane electrode assembly;
4. a manifold for the delivery and removal of reactants and reactant products to and from the fuel cell reactive areas where said manifold may be either a single or multiple manifolds; and/or
5. a bond interposed between said manifold and said flexible or rigid separator plate, wherein said bond affixes said manifold to said flexible or rigid separator plate and wherein said bond provides a seal between said manifold and said flexible or rigid separator plate to prevent the release of reactants from the fuel cell. In one embodiment the membrane electrode assembly has within it incorporated or bonded reactant diffusion layers as a single assembly.

In another embodiment the membrane electrode assembly is independent from the reactant diffusion layers.

In another embodiment in the fuel cell the flexible adhesive bond incorporates a gasket having adhesive on one side, on both sides or on neither side. This gasket material may be comprised of a single one-component material or a composite material composed of two or more components. The gasket material may be formed as a separate component or be formed on the surface of the separator plate or on the membrane electrode assembly.

In another embodiment the adhesive bond is solely an adhesive without the use of a gasket that may either be applied to the separator plate or to the membrane electrode assembly or to both.

In another embodiment of the gasket material may be in the form of a foam composed of a single one-component material or a composite material composed of two or more components with or without an incorporated adhesive.

In another embodiment the adhesive is applied directly to the bipolar separator plate before placing and adhering the membrane electrode assembly to the bipolar separator plate. The adhesive functions as a sealant to confine the reactants and as a fixative for securing the membrane electrode assembly to the separator plate.

In addition, assembled and tested modular cells clearly showed measurable consistency between cells. Even with a hand assembly technique nineteen demonstrated non-leaking cells operating as an ambient air natural convection stack system at 25 mA/cm$^2$ showed a variation within 5% of the average cell voltage for the stack.

The embodiments of the present invention differ considerably from U.S. Pat. No. 6,080,503 in as much as the present invention pertains to a single separator plate bonded to a single membrane electrode assembly as opposed to the conventional art teaching of two separator plates bonded to each side of a single membrane electrode assembly. The manufacturing improvement and increase in efficiency of these components is readily apparent.

BRIEF DESCRIPTION OF THE FIGURES

FIG. 1 is a schematic representation of the basic conventional fuel cell process. It shows the extracted hydrogen ions which combine with oxygen across a PEM membrane to produce electrical power.

FIG. 2 is a schematic representation of the conventional PEM fuel cell stack of electrodes compressed together with heavy end plates and tie rod bolts.

FIG. 3 is a schematic representation of an exploded view of a conventional PEM single cell of a conventional fuel cell assembly.

FIG. 4 is a schematic representation of an exploded view of a conventional PEM fuel cell stack of electrodes showing the arrangement of the internal and external parts.

FIGS. 5A and 5B are a schematic representations of the obverse and reverse integrated and modular bipolar separator plate (BSP), membrane electrode assembly (MEA) and manifold.

FIG. 6 is an exploded schematic representation of the integrated and modular fuel cell assembly.

FIGS. 7A and 7B are detailed schematic representations of the integrated and modular cell assembly showing manifold and MEA attachments.

FIGS. 8A, 8B, 8C and 8D are schematic representations of the integrated and modular cell components and assembly having a single manifold of the present invention.

DETAILED DESCRIPTION OF THE INVENTION AND PREFERRED EMBODIMENTS

Definitions

Figure 5C:
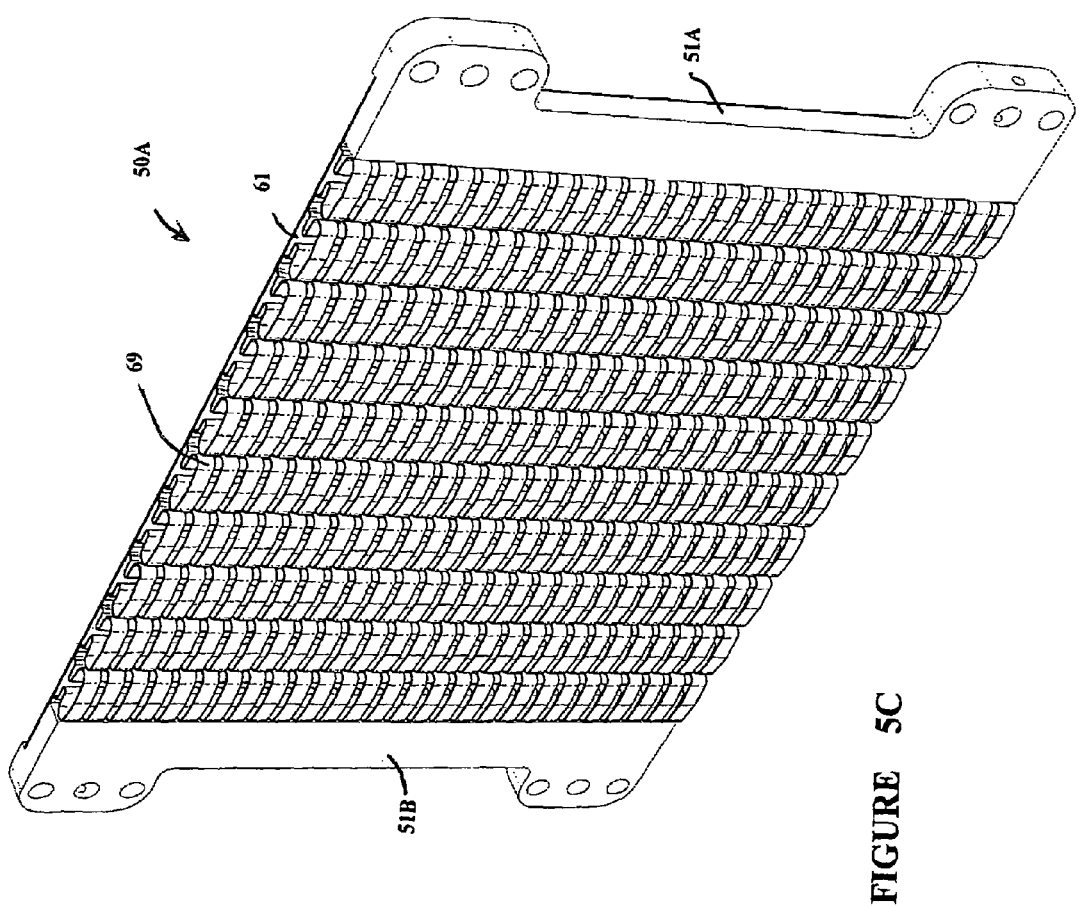
FIG. 5C is a schematic representation of reverse of an integrated and modular bipolar separator plate showing an alternate, vertical, arrangement of the compliant contacts.

As described herein:

"BSP" refers to bipolar separator plates which term is conventional in the art.

"Flexible" refers to the BSP and/or MEA ability to flex with the forces and pressures of operation. The bonds between the components are substantially leak free. This flexibility assures that electrical contact is maintained by the compliant contacts as referenced in U.S. Ser. No. 60/226,471, filed Aug. 18, 2000; and U.S. Ser. No. 09/834,389, filed Apr. 13, 2001.

"Materials of construction" refers to the conventional materials that one of skill in the art would normally select to produce a conventional fuel cell. Unless otherwise noted herein for the present invention, conventional materials of construction are used.

"MEA" refers to the membrane electrode assembly.

"PEM" refers to proton exchange membrane—a component of a MEA and fuel cell.

"Module" refers to identical single interchangeable separable components containing the bipolar separator plate, membrane electrode assembly, separate diffusion layers (if used), gaskets (if used), manifolds adhesives, and seals (if used) and comprises a single electrochemical cell.

As stated above, traditional fuel cell design has relied on the "filter press" type of fabrication and assembly, see FIG. 2, i.e., end-plates and tie-rods, to create suitable electrical contact between the MEA and adjacent BSP, see FIG. 3. In the conventional fuel cell art, all the BSPs and MEAs must be assembled concurrently during the assembly of the fuel cell stack see FIG. 4. This assembly method requires that all manifold and membrane sealing as well as electrical contact be accomplished at once when the stack of cells is in final assembly. If there is leakage or poor electrical contact in a single cell, then all the cells of the stack must be disassembled for remediation. While there are other assembly methods used in the fabrication of fuel cell stacks, none use a true modular approach to fuel cell assembly. This is the case for U.S. Pat. No. 6,080,503 wherein in the conventional art, a single MEA is "adhesively bonded to a pair of separator plates." While the language of this issued patent uses the term "module," these are not true single cell modules. They are better described as one and a half cell subassemblies, which are then combined into a stack and "compressed between two end plates in order to maintain good electrical plate-to-plate contact between two adjacent modules." This is nothing more than preassembling portions of the stack beforehand and then assembling them in the conventional inefficient bulky filter press method.

With reference to FIGS. 5A, 5B, 50, 6, 7A and 7B, the present fuel cell design 50, 50A uses a single thin metal plate BSP 61 onto which the MEA 65 and reactant manifolds 51A, 51B are assembled into modular units prior to being incorporated into a complete fuel cell unit (stack). These fuel cell modules are comprised of a single BSP 61, which may contain a reactant flow pattern 62, the MEA 65 with or without an incorporated diffusion layer 67, separate diffusion layers if needed, an adhesive 66 or an adhesive backed gasket 64, the reactant manifolds 51A, 51B and the manifold seals or adhesives 64A or 66.

By way of example, and not of limitation, the thin BSP in the present fuel cell design can have a thickness between about 0.001 and 0.500 inches and an area between 0.1 and 5000 square inches.

Other features in FIGS. 5A, 5B, 5C, 6, 7A and 7B include on the obverse adhesive or gasket by the hole 52, reactant passageway 53, edge seal 54, inactive border 55 and active membrane 56. FIG. 5B in this orientation has improved control of heat On the reverse side FIG. 5B, the features are the same as for FIG. 5A and further include the multiple arrays of compliant electrical contacts 69 as described in pending U.S. Application Ser. No. 60/226,471. FIG. 5C shows an alternate arrangement of the multiple arrays of compliant electrical contacts 69 as described in pending U.S. Application Ser. No. 60/226, 471.

In the modular cell stack assembly, the manifolds 51A, 51B contact the adjacent manifold of the next modular cell. The compliant electrical contacts 69 contact the active membrane 65 of the adjacent cell.

Conventional fuel cell design is followed up to a certain point. See teachings of U.S. Pat. No. 6,030,718 and other U.S. patents listed on pages 2, 3 and 4 above. As is apparent to those skilled in the art, these incorporated-by-reference U.S. patents disclose and the basic design to fabricate a conventional fuel cell. With the text and figures provided herein, those skilled in the art are enabled to fabricate the present invention. In the creation of the single cells integrated modules of the present invention, the following additional methodology is followed:

Conventional fuel cell designs are sealed around the edge of the BSP and the BSP to the MEA by the use of substantially non-adhesive inert gaskets. The pressure from the tie-rods and end-plates holds and seals the assembly in place.

In contrast, the modular design shown in FIGS. 5A, 5B, 5C, 6, 7A and 7B, utilizes adhesives or gaskets with adhesive seals between the MEA 65 and single BSP 61. FIGS. 7A and 7B show an adhesive 66, with or without a carrier gasket 64, to bond the MEA 65 to the hydrogen side of the BSP 61. In addition, the reactant manifolds 51A, 51B are adhesively bonded 64A to the BSP 61 in a similar manner, as is the MEA 65.

The manifolds 51A, 51B are external to the BSP 61 and the MEA 65. The MEA 65 does not have holes for manifold or gas passages. This feature eliminates the use of the MEA 65 as a through passage and, likewise eliminates any possible leakage due to a through passage through the membrane 67.

This new assembly process creates an integrated, leak proof assembly. Each assembly is leaked tested and performance tested independently from the stack of the individual cells as is conventional in the art.

This novel method of assembly decouples the MEA sealing from the stack assembly, and compressive loads of the end-plates and tie-rods.

The individual components of the integrated and modular BSP/MEA separator plates for fuel cells are mass-produced and assembled into the integrated and modular BSP/MEA and tested independently off-line to increase the assurance that a functional stack of cells will be produced.

Additionally, since each module is an integrated, sealed unit, the stack is assembled and held together more simply than the traditional means of heavy end-plates and tie-rods required to maintain sealing and intimate contact between surfaces to effect electrical conductivity.

The manifold 81 on the integrated, modular BSP/MEA is of a single arrangement as shown in FIGS. 8A, 8B, 8C and 8D or multiple manifolds of those shown in FIGS. 5A, 5B, and 5C. The manifolds 51A and 51B allow the delivery and exhausting of the reactants and reaction products respectively. In a multiple manifold configuration, FIGS. 5A, 5B, 5C and 6 the reactants may be delivered on one side by one manifold 51A and the reaction products exhausted on the other side by a different manifold 51B. By way of example and not of limitation, a multiple manifold configuration could have up to 26 manifolds. In the single manifold 81 configuration the reactants may be delivered and exhausted by the single manifold 81.

The BSP can be made out of any appropriate materials, including metal materials, composite materials, polymeric plastic materials, or combinations of these materials. The manifolds can also be made out of a number of appropriate materials, including plastic, composite, or metallic materials.

Any adhesives or gaskets incorporating adhesives necessarily must form an adequate bond with the bipolar separator plate and the membrane electrode assembly and between the bipolar separator plate and the membrane electrode assembly and between the bipolar separator plate and the manifold. Below are a few examples of adhesives, which may be of use in bonding the MEAs and manifolds to the BSPs:

Specific commercial tapes of the 3M Corp. (of St. Paul, Minn.) family of VHB (Very High Bond) Tapes, such as product number 4920, a closed-cell acrylic foam carrier with adhesive, or F-9469 PC, a adhesive transfer tape (trademarks of the 3M Company of St. Paul Minn.).

Commercial acrylic adhesives such as Loctite Product 312 or 326 (trademark of the Loctite Corporation of Rocky Hill, Conn.) or 3M Scotch-Weld Acrylic Adhesive such as DP-805 or DP-820 (trademark of the 3M Company St. Paul Minn.).

Specific epoxy products such as 3M 1838 (trademark of the 3M Company of St. Paul Minn.) or Loctite E-20HP. (Trademark of the Loctite Corporation of Rocky Hill, Conn.)

These examples are not to imply the only materials applicable to the bonding of the MEAs and the BSPs and the manifolds to the BSPs but only illustrate some of the suitable materials. These materials are applied with the typical methods made use of by those skilled in the art such as hand or robotic placement, hand or robotic dispensing, screen or stencil printing, rolling and spraying.

In one embodiment, 3M Company VHB tape #4920 closed cell acrylic foam with adhesive is used as described herein. This results in well-bonded manifolds to bipolar separator plates and MEAs to BSPs. The resulting fuel cell operates with comparable, better efficiency or significantly better efficiency than those fuel cells, which are conventional in the art.

Other appropriate materials may be used for the bonds, seals, gaskets, or adhesives recited herein, such as plastic polymeric materials, elastomeric materials, metals or metallic materials, and combinations of these materials.

While only a few embodiments of the invention have been shown and described herein, it will become apparent upon reading this application to those skilled in the art that various modifications and changes can be made to provide a flexible or rigid modular BSP/MEA thin bipolar separator plates and components for fuel cells in a fully functioning fuel cell device without departing from the spirit and scope of the present invention. The present approach to produce a novel fuel cell is applicable to generally any cell geometry or configuration, such as rectangular, square, round or any other planar geometry or configuration. All such modifications and changes coming within the scope of the appended claims are intended to be carried out thereby.

We claim:

1. A modular fuel cell for assembly within a fuel cell stack comprising an array of fuel cells, comprising:
   a single bipolar separator plate;
   a flexible membrane electrode assembly;
   a flexible bond, seal or gasket interposed between said single separator plate and said flexible membrane electrode assembly; and
   wherein said flexible bond, seal or gasket seals the edge portions of said flexible membrane assembly to prevent the release of reactants from the fuel cell;
   a manifold for the delivery and removal of reactants and reactant products to and from the fuel cell reactive areas; and
   a bond interposed between said manifold and said separator plate, wherein said bond affixes said manifold to said separator plate and wherein said bond provides a seal between said manifold and said separator plate to prevent the release of reactants from the fuel cell;
   wherein said bipolar separator plate, membrane electrode assembly, manifold, flexible bond, and seal or gasket are arranged so as to form a single fuel cell comprising a sealed, integrated unit independently removable from the fuel cell stack.

2. The fuel cell of claim 1, wherein said modular fuel cell is assembled as an independent, integrated, leak-proof assembly that forms a seal without additional pressure from adjacent cell stack components.

3. The fuel cell of claim 2, wherein said seal is formed between the bipolar separator plate and the membrane electrode assembly.

4. The fuel cell of claim 1, wherein said separator plate comprises a metal material, a composite material, a polymeric plastic material, or combinations thereof.

5. The fuel cell of claim 1, wherein the separator plate has a thickness between about 0.0001 inch and about 0.500 inch and area of between 0.1 inches square and 5000 inches square.

6. The fuel cell of claim 1, wherein the separator plate is of a square configuration, a rectangular configuration or other polygonal configuration, a circular configuration or any other rounded configuration.

7. The fuel cell of claim 1, wherein said bond, seal or gasket is applied to said separator plate or said bond, seal or gasket is applied to said membrane electrode assembly and said separator plate and said membrane electrode assembly are bonded and or sealed together as a single unit.

8. The fuel cell of claim 1, wherein the bond, seal or gasket comprises a plastic polymeric material, or an elastomeric material, a composite material, a metallic material, a foam material, or combinations thereof.

9. The fuel cell of claim 1, wherein said bond, seal or gasket of forms part of the reactant flow field.

10. The fuel cell of claim 1, wherein said manifolds are external to the BSP and the MEA as to not cause disruption or through holing of the MEA either internal or external to the electrochemically active area.

11. The fuel cell of claim 1, wherein said manifolds are bonded to said BSP.

12. The fuel cell of claim 1, wherein said manifold comprises a plastic material, or a composite material, or a metallic material.

13. The fuel cell of claim 1, wherein said manifold is a single manifold.

14. The fuel cell of claim 1, wherein said fuel cell stack comprises up to 26 manifolds.

15. The fuel cell of claim 1, wherein said manifold has passages for a single reactant or multiple reactants and or a coolant or multiple coolants.

16. The fuel cell of claim 1, wherein said bond between said manifold or manifolds and said bipolar separator plate comprises a plastic material, a elastomeric material, a composite material, a metallic material, a foam material, or combinations thereof.

17. The fuel cell of claim 1, wherein any bond, seal or gasket material is applied manually, robotically, by printing, stenciling, or silk screening.

18. The fuel cell of claim 7, wherein the bond, seal or gasket comprises a plastic polymeric material, an elastomeric material, a composite material, a metal, a foam or combinations thereof.

* * * * *